Figure 1:
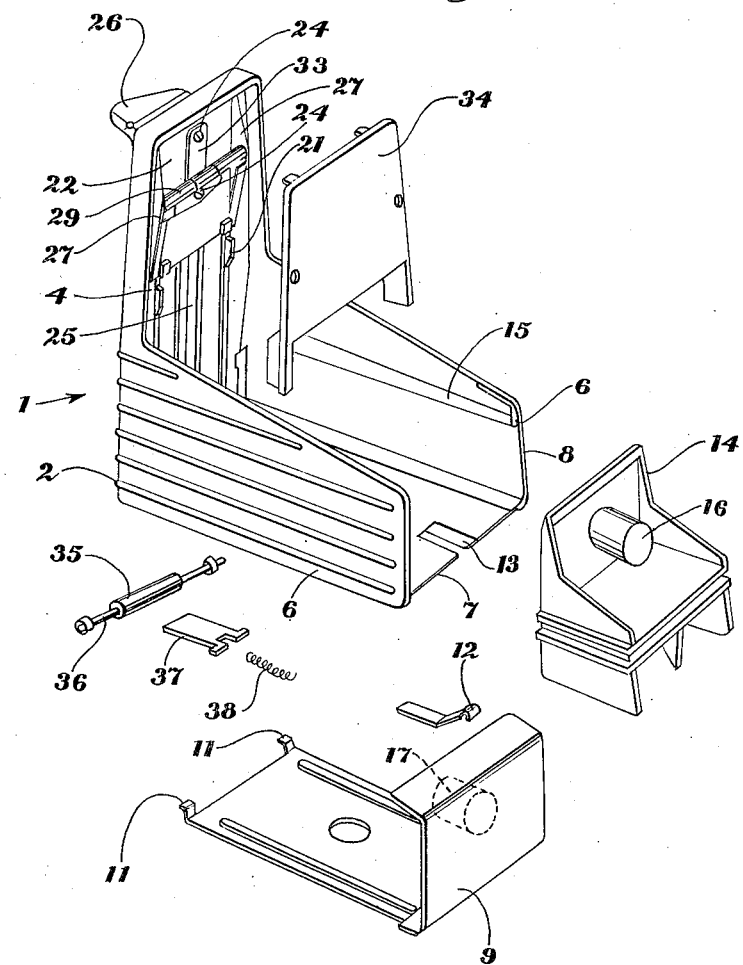

June 12, 1962     H. A. NAGEL     3,038,270
SLIDE CHANGER

Filed Sept. 25, 1959     2 Sheets-Sheet 1

*Helmut Nagel*
INVENTOR.

BY
ATTORNEYS

United States Patent Office 3,038,270
Patented June 12, 1962

3,038,270
SLIDE CHANGER
Helmut A. Nagel, Stuttgart, Germany, assignor to Eastman Kodak Company, Rochester, N.Y., a corporation of New Jersey
Filed Sept. 25, 1959, Ser. No. 842,492
Claims priority, application Germany Feb. 7, 1959
3 Claims. (Cl. 40—78)

This invention relates generally to slide projectors, and more specifically to an improved slide changer for a slide projector.

Slide projectors of the type having a housing provided with a projection aperture arranged in alignment with the optical axis of the projector are well known in the art. Most of the slide projectors of this type are provided with a slide changing mechanism for successively transporting slides from a supply magazine along a guideway into registration with the projection aperture. After the slide is viewed, it is moved from the projection aperture into a take-up magazine. The direction of movement of the slide changing mechanism for moving the projected slide into the take-up magazine depends upon whether the take-up magazine is at the opposite end or at the same end of the slide changer as the supply magazine. The supply and take-up magazines may be arranged at opposite ends or at the same end of the slide changer and are normally provided with followers of one type or another positioned in the magazines to maintain the slides therein in stacked relation. Suitable springs may be provided by the slide changer for retaining the positioned slide in proper registering relation with the projection aperture. Also, suitable mechanism may be provided by the changer or projector for moving the slides from the projecting position to the take-up magazine. Most of the structure so far described may be of standard and well-known construction.

It has been found that when the slide changer is moved to shift the front or foremost slide in the supply magazine out of the magazine and along the guideway, such slide movement may be impeded by reason of interference between the edges of the aperture of the slide being moved and the edges of the aperture of the adjacent slide in the supply magazine, all of which is well known to those familiar with slide projectors. In order to eliminate the possibility of such slide interference, the present invention tilts the slides in the supply magazine at a slight angle with respect to the slide guideway. Then, when the slide changer is moved in a direction to shift the front slide out of the supply magazine, initial movement of the slide changer forces the leading edge of the slide along the slide guideway while the trailing portion of the slide is still maintained at an angle with respect to the slide guideway. In this position, the slide is partially bent with the leading portion thereof parallel to the guideway and the trailing portion at an angle thereto. Upon further movement of the slide, the trailing portion of the slide is no longer maintained or held at an angle with respect to the slide guideway and the inherent resiliency in the bent slide causes the trailing portion thereof to be urged into contact with the guideway. At this stage of the slide-changer movement, a cam formed thereby engages the slide adjacent the slide being moved and upon further advance of the slide changer, tilts the adjacent slide and the remaining slides in the supply magazine away from the guideway increasing the angle between the remaining slides and the slide guideway. This cam action assures non-interference between the slide being transported into a viewing position and the next adjacent slide thereby permitting free movement of the front or foremost slide out of the supply magazine upon movement of the slide changer.

The present invention has as one of its primary objects the provision of an improved slide changer for a slide projector for eliminating the interference between a slide being transported from the supply magazine to a viewing position and an adjacent slide of such magazine.

Another object of this invention is the provision of an improved slide changer for a slide projector that is of simple design and construction, thoroughly reliable and efficient in operation, and economical to manufacture.

Figure 2:
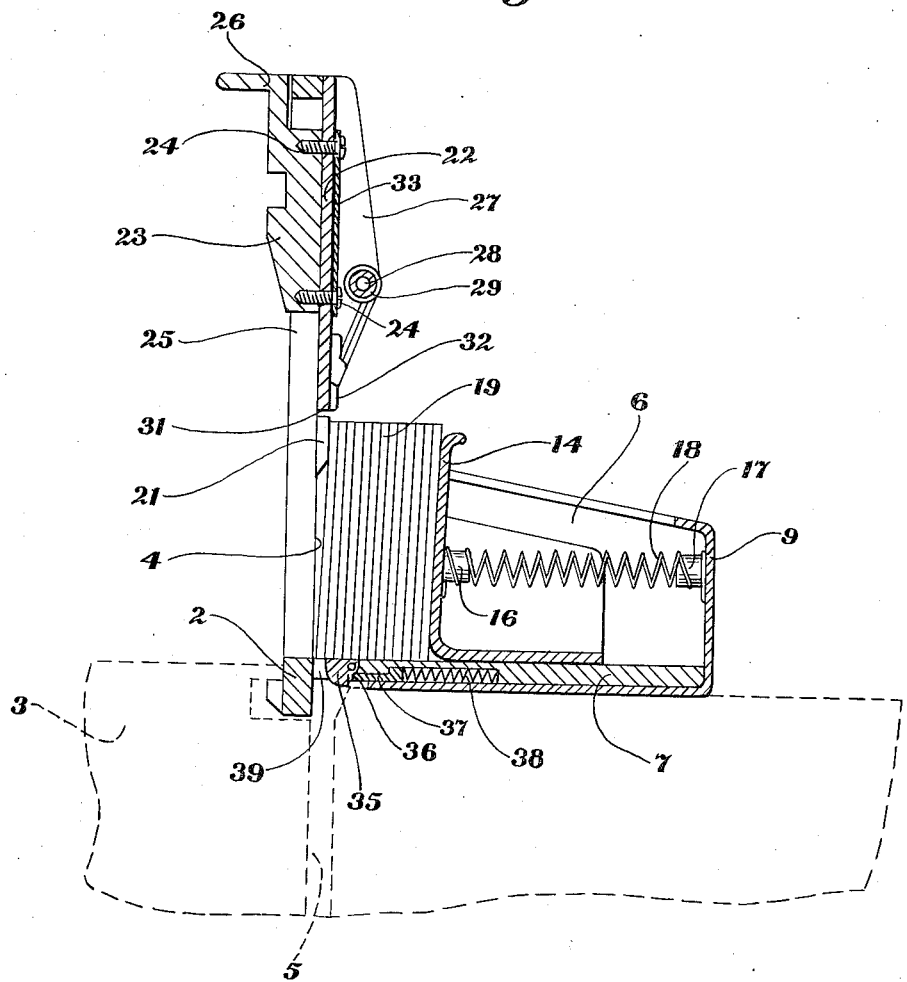

Objects and advantages other than those set forth above will be apparent from the following description when read in connection with the accompanying drawings, in which:

FIG. 1 is an exploded view in perspective showing a preferred embodiment of the slide changer of this invention; and FIG. 2 is an enlarged section view taken substantially through the center of the slide changer of FIG. 1 in an assembled condition except for the cover plate.

As shown in the drawings, the slide changer 1 comprises a housing 2 adapted to be detachably connected to a slide projector 3, a portion of which is shown dotted. Although applicant's slide changer is of the type that may be detachably secured to a slide projector, it should be understood that housing 2 may be fixedly secured to slide projector 3 or integrally formed therewith. The housing 2 has a vertical wall as best seen in FIG. 2 providing a slide guideway 4 in alignment with a slide guideway 5, seen dotted in FIG. 1, formed by slide projector 3. The housing 2 further has side flanges 6 integrally formed with a base 7 of housing 2 to provide a slide supply magazine 8. A cover sheet 9 is detachably secured to magazine 8 by means of ears 11 engaging complementary slots provided by housing 2, and a locking spring 12 secured to sheet 9 and cooperating with a slot 13 in base 7. A pressure plate or slide follower 14 is disposed in magazine 8 for reciprocal movement in a longitudinal direction but is prevented from movement in a vertical direction by means of side guides 15, only one of which can be seen in FIG. 1, secured to flanges 6 of magazine 8. The follower 14 and cover sheet 9 are provided with aligned pins 16, 17 seen best in FIG. 2, and a helical spring 18 is interposed between follower 14 and cover sheet 9 with each end thereof surrounding one of the pins for urging follower 14 toward guideway 4. A plurality of slides 19 which are to be viewed are interposed between slide follower 14 and slide guideway 4, and the guideway is further provided with integrally formed projections 21 adapted to engage the trailing portion of the foremost slide 19 for tilting the slides in magazine 8 at a slight angle with respect to guideway 4. The slide transport means comprises a slider plate 22 secured to a guide member 23 by means of screws 24. The guide member 23 extends into a slot 25 formed by guideway 4 and is reciprocally movable by means of a handle 26. A T-shaped spring plate 33 is interposed between the heads of screws 24 and slider plate 22 for adjusting the tension of slider plate 22 against guideway 4. The slider plate 22 is provided with cams 27 at each side thereof which serve as a bearing for a shaft 28 which in turn serves as a bearing support for a roller 29. The slide-engaging end 31 of slider plate 22 is provided with a pair of lugs 32 which serve to widen or broaden slide-engaging end 31 of plate 22. A cover member 34 is detachably secured to housing 2 for enclosing the slide transport means.

The base 7 of housing 2 is provided with a feed control mechanism for accommodating slides 19 of different thicknesses. The feed control mechanism comprises a lock member 35 pivoted on shaft 36 and urged in a clockwise direction by a slider plate 37 and spring 38. The slot 39 formed by the spacing between member 35 and the outer surface of guideway 4 is properly selected to permit relatively effortless passage of the slides 19 therethrough.

In the operation of slide changer 1, it is initially detachably secured to a slide projector 3 a part of which is shown dotted in FIG. 2. In this position, the outer surface of guideway 4 is in alignment with a surface of slide guideway 5 of the projector which is also shown dotted in FIG. 2. The slide transport means is positioned in its fully withdrawn position with slide plate 22 out of engagement with any of the slides 19 in supply magazine 8. To shift the foremost slide 19 to the slide viewing position, the operator grasps handle 26 and moves the slide transport means downwardly. The slide engaging end 31 of slider plate 22 engages the foremost slide 19 and urges the slide downwardly into slide guideway 5 of projector 3. In this position, the slide 19 being moved is partially bent with the leading portion thereof parallel to slide guideway 4 while the trailing portion of the slide 19 is at an angle thereto. Further downward movement of slider plate 22 urges slide 19 past projection 21 whereupon the inherent resiliency of the bent slide causes the trailing portion thereof to move into engagement with the surface of guideway 4. Also, slider plate cam 27 engages the slide adjacent to the slide being moved and urges the adjacent slide and slide follower 14 in a direction against the bias of spring 18, further separating the slide being moved from the remaining slides 19 in supply magazine 8 for eliminating any edge interference betwen the slides. Upon further downward movement of the slide transport means, roller 29 engages the slide adjacent to the slide being moved thereby reducing the sliding friction between slider plate 22 and the adjacent slide for minimizing the likelihood of any damage thereto.

The invention has been described in detail with particular reference to preferred embodiments thereof, but it will be understood that variations and modifications can be effected within the spirit and scope of the invention as described hereinabove and as defined in the appended claims.

I claim:
1. In a slide changer for a slide projector of the type in which slides are moved edgewise one at a time along a guideway from a supply position toward a viewing position, the combination comprising: a slide changer housing; a supply magazine supported by said housing for holding slides in said supply position; a fixed projection on said housing and extending outwardly from the surface of said guideway, said projection adapted to engage a trailing end of the foremost slide for tilting said slides in said supply magazine at an angle with respect to the plane of said guideway, said housing further having a portion thereof co-operating with said surface of said guideway to form a slot therebetween having a width slightly greater than the width of a slide and in register with a leading end of a slide to be transported, said portion of said housing and said surface further co-operating to direct a slide transported through said slot in a direction parallel to said surface; and slide transport means for engaging said trailing end of the foremost tilted slide and transporting said slide along said surface of said guideway from said supply position toward said viewing position, said slide during its initial movement being subjected to a force caused by said leading end of said slide being held parallel to and in contact with the surface of said guideway by virtue of said portion of said housing and said surface of said guideway while the trailing end of said slide is at an angle with respect to the surface of said guideway by virtue of said projection, whereby said trailing end of said slide is urged against said surface of said guideway and out of interference with the remaining slides after the trailing portion of said slide clears said projection.

2. The invention according to claim 1 wherein said slide transport means comprises a slider plate reciprocally movable on said guideway and having a slide-engaging portion and a cam means adapted upon movement of said slider plate in a direction moving said foremost slide to said viewing position to engage the slide adjacent to said foremost slide and cam said engaged slide and the remaining slides in a direction away from said foremost slide to assure non-interference between said foremost slide and said adjacent slide.

3. The invention according to claim 2 wherein said guideway has an elongated opening therethrough, and said slider plate is slidably movable on one side of said guideway by a handle disposed on the opposite side of said guideway and having a portion thereof movable in said opening, and a spring interconnecting said handle and slider plate for controlling the pressure of said plate against said guideway.

References Cited in the file of this patent
UNITED STATES PATENTS

| | | |
|---|---|---|
| 2,513,102 | Parlini | June 27, 1950 |
| 2,583,442 | Parlini | Jan. 22, 1952 |
| 2,705,437 | Lessman | Apr. 5, 1955 |
| 2,849,814 | Rideout | Sept. 2, 1958 |
| 2,869,260 | Rideout | Jan. 20, 1959 |